(12) United States Patent
Yeh

(10) Patent No.: US 7,149,911 B2
(45) Date of Patent: Dec. 12, 2006

(54) PORTABLE COMPUTER WITH DESKTOP TYPE PROCESSOR

(75) Inventor: Shih-Ping Yeh, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 459 days.

(21) Appl. No.: 10/784,741

(22) Filed: Feb. 24, 2004

(65) Prior Publication Data

US 2004/0168096 A1    Aug. 26, 2004

(30) Foreign Application Priority Data

Feb. 25, 2003    (TW) .............................. 92103918 A

(51) Int. Cl.
*G06F 1/32*    (2006.01)
(52) U.S. Cl. ...................... 713/322; 713/320
(58) Field of Classification Search ................ 713/300, 713/320, 322, 323
See application file for complete search history.

(56) References Cited

U.S. PATENT DOCUMENTS

| 6,233,691 B1 | 5/2001 | Atkinson |
| 6,457,135 B1 * | 9/2002 | Cooper ......................... 713/323 |
| 6,845,456 B1 * | 1/2005 | Menezes et al. ............. 713/320 |
| 7,010,704 B1 * | 3/2006 | Yang et al. ................... 713/300 |
| 2004/0117680 A1 * | 6/2004 | Naffziger ..................... 713/322 |
| 2004/0128567 A1 * | 7/2004 | Stewart ........................ 713/300 |

FOREIGN PATENT DOCUMENTS

| CN | 1294328 | 5/2001 |
| CN | 1338067 | 2/2002 |
| CN | 2523098 | 11/2002 |
| TW | 171079 | 10/1991 |

* cited by examiner

*Primary Examiner*—Dennis M. Butler
(74) *Attorney, Agent, or Firm*—Rabin & Berdo, PC

(57) ABSTRACT

A portable computer with a desktop type processor. The portable computer further includes a power management controller and a clock generator. The power management controller judges the type of power supply used by the portable computer. The clock generator is coupled to the power management controller and the desktop type processor respectively, and outputs a clock signal based on a control signal from the power management controller and a judge signal from the desktop type processor so as to determine an operational frequency and an operational voltage of the desktop type processor.

13 Claims, 3 Drawing Sheets

221

|  | AC || DC ||
|---|---|---|---|---|
|  | CPU1 | CPU2 | CPU1 | CPU2 |
| over clock | Fa Va | Fd Vd | Fg Vg | Fj Vj |
| normal | Fb Vb | Fe Ve | Fh Vh | Fk Vk |
| powersaving | Fc Vc | Ff Vf | Fi Vi | Fl Vl |

221

| | AC | | | | DC | | | |
|---|---|---|---|---|---|---|---|---|
| | CPU1 | | CPU2 | | CPU1 | | CPU2 | |
| over clock | Fa | Va | Fd | Vd | Fg | Vg | Fj | Vj |
| normal | Fb | Vb | Fe | Ve | Fh | Vh | Fk | Vk |
| powersaving | Fc | Vc | Ff | Vf | Fi | Vi | Fl | Vl |

PORTABLE COMPUTER WITH DESKTOP TYPE PROCESSOR

BACKGROUND OF THE INVENTION

1. Field of the Invention

The invention relates to a portable computer with a desktop type processor; in particular, to a portable computer that can effectively drive a desktop type processor in a power saving mode.

2. Description of the Related Art

Recently, portable computers have become lighter and easier to carry, hence they are widely used. As the technology of portable computers has developed, they have become as powerful and functional as their desktop counterparts. Although portable computers are convenient, they are still too expensive price for many people. Thus, reducing the cost of portable computers has become an important issue for manufacturers. One way to reduce the cost is to replace the portable type processor with a desktop type processor so that portable computer prices can be reduced.

Referring to FIG. 1a, a conventional portable computer 10 with a desktop type processor 12 is shown. The desktop type processor 12 outputs a signal to a clock generator 11 via an I²C bus 14 so that the clock generator 11 can acknowledge the type of desktop type processor 12. Thus, the clock generator 11 can output a clock signal corresponding to the processor 12 so as to determine the operational frequency and operational voltage of the processor 12. It is noted that before the outer operational voltage determined by the clock generator 11 enters the processor 12, it passes through a DC-DC voltage converter 12 so as to be transferred into an inner operational voltage suitable for use by the processor 12.

It is understood that the portable computer 10 includes a chipset and a memory and other devices therein. Operational frequencies and voltages of the chipset and the memory and other devices correspond to the operational frequency and voltage of the processor 12.

In the conventional portable computer 10, when the desktop type processor 12 is driven in a power saving mode, the throttling manner as shown in FIG. 1b is utilized. Specifically, the processor 12 is sometimes operated by using higher power (about 30 W), and is sometimes operated by using lower power (about 6 W).

That is, as shown in FIG. 1b, the processor 12 sometimes operates in normal mode (which consumes more power) while it is in the power saving mode. In addition, the operational voltage of the processor 12 is proportional to the consumed power. Since the processor 12 in power saving mode sometimes requires higher power consumption to operate, the processor 12 is operating in at the normal voltage level. Thus, the purpose of reduced power consumption cannot be achieved.

In addition, as shown in FIG. 1b, since power consumption fluctuates, the processor 12 also operates with fluctuating voltage, thus reducing the reliability of the processor.

SUMMARY OF THE INVENTION

In view of this, the invention provides a portable computer that can effectively drive a desktop type processor in a power saving mode.

Accordingly, the invention provides a portable computer with a desktop type processor. The portable computer further includes a power management controller and a clock generator. The power management controller judges the power type of the portable computer. The clock generator is coupled to the power management controller and the desktop type processor respectively, and outputs a clock signal based on a control signal from the power management controller and a judge signal from the desktop type processor so as to determine the operational frequency and voltage of the desktop type processor.

In a preferred embodiment, the clock generator includes a plurality of transformation tables therein so that the appropriate clock signal is generated from the control signal and the judge signal by referencing the transformation tables.

Furthermore, the portable computer further includes a DC power supply coupled to the power management controller so that the power management controller outputs a first control signal to the clock generator. The clock signal of the clock generator is changed by the transformation table corresponding to the first control signal.

It is understood that the DC power supply may be a battery.

Furthermore, the portable computer further includes an AC power supply coupled to the power management controller so that the power management controller outputs a second control signal to the clock generator. The clock signal of the clock generator is changed by the transformation table corresponding to the second control signal.

In another preferred embodiment, the portable computer further includes a chipset coupled to the clock generator. An operational frequency and voltage of the chipset are changed based on the operational frequency and voltage of the desktop type processor.

In another preferred embodiment, the portable computer further includes a memory coupled to the clock generator. An operational frequency and an operational voltage of the memory are changed based on the operational frequency and voltage of the desktop type processor.

In another preferred embodiment, the portable computer further includes a converter coupled to the clock generator and the desktop type processor so as to convert the voltage of the clock generator to the operational voltage of the desktop type processor.

In another preferred embodiment, the desktop type processor includes a plurality of calculation modes therein, and the operational frequency and voltage of the desktop type processor are linearly changed when the calculation modes change.

In this invention, a power saving method for a portable computer with a desktop type processor is provided. The method includes the following steps. A plurality of transformation tables are provided. An operational frequency and voltage of the desktop type processor are determined from the type and calculation mode of the desktop type processor by referencing the transformation tables.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 2:
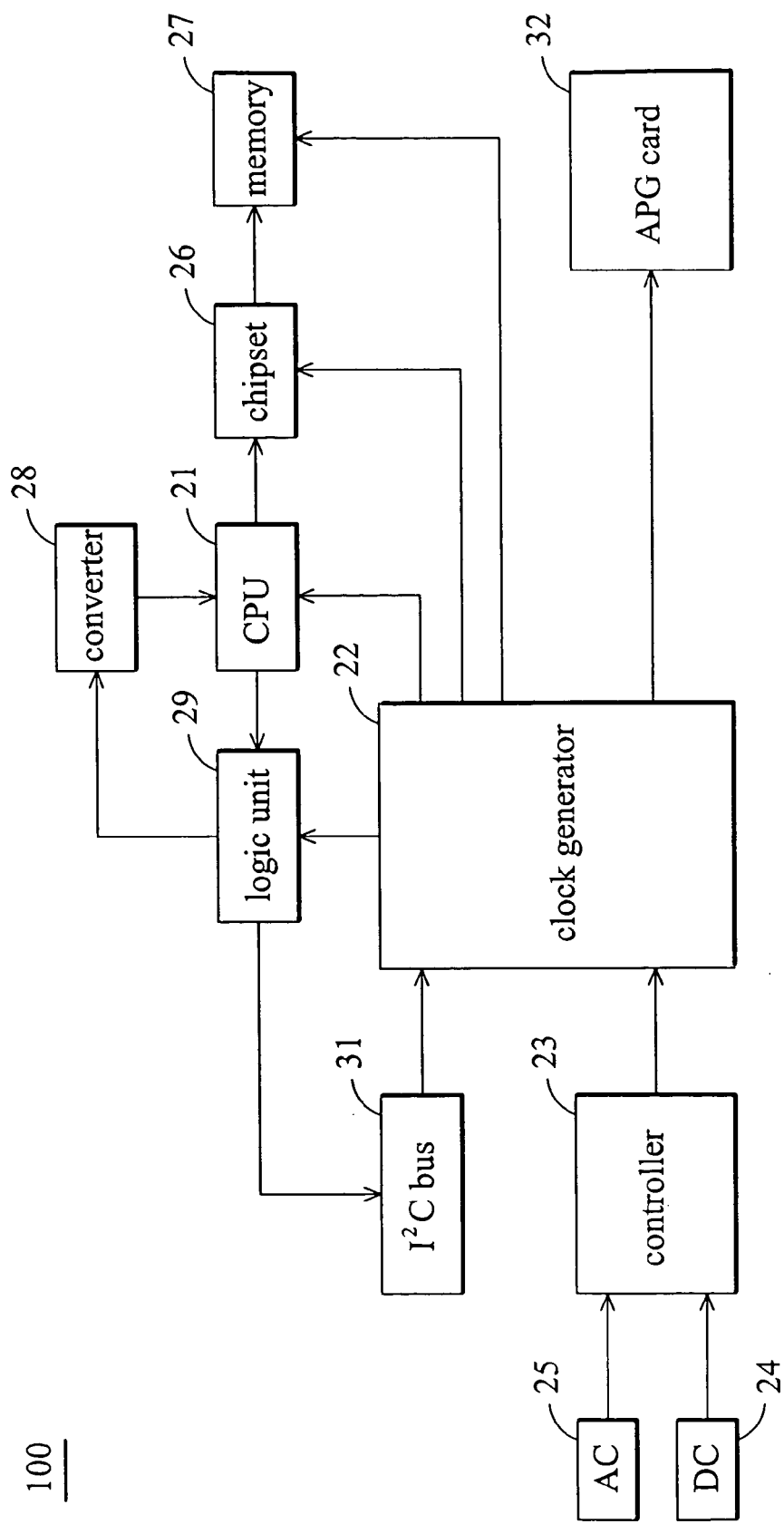
FIG. 2 is a block diagram of a portable computer with a desktop type processor as disclosed in this invention.

FIG. 2 shows a portable computer 100 with a desktop type processor as disclosed in this invention. The portable computer 100 includes a desktop type processor 21, a clock generator 22, a power management controller 23, a DC power supply 24, an AC power supply 25, a chipset 26, a memory 27, a DC-DC converter 28, a logic unit 29, an $I^1C$ bus 31, and an APG card 32.

The desktop type processor 21 is used as an operation center of the portable computer 100, and is coupled to the clock generator 22. It is noted that the desktop type processor 21 is directly coupled to the clock generator 22 in FIG. 2. However, it is not limited to this. For example, the desktop type processor 21 may be coupled to the clock generator 22 via the chipset 26. Furthermore, based on the design of this invention, the desktop type processor 21 can be operated at different operational frequencies and voltages, and its detailed description is described as follows.

The clock generator 22 is coupled to the power management controller 23, the desktop type processor 21, the chipset 26, the memory 27, and the APG card 32 respectively. Based on a control signal from the power management controller 23 and a judge signal from the desktop type processor 21, the clock generator 21 outputs a clock signal to determine an operational frequency and voltage of the desktop type processor 21.

Figures 3, 4:
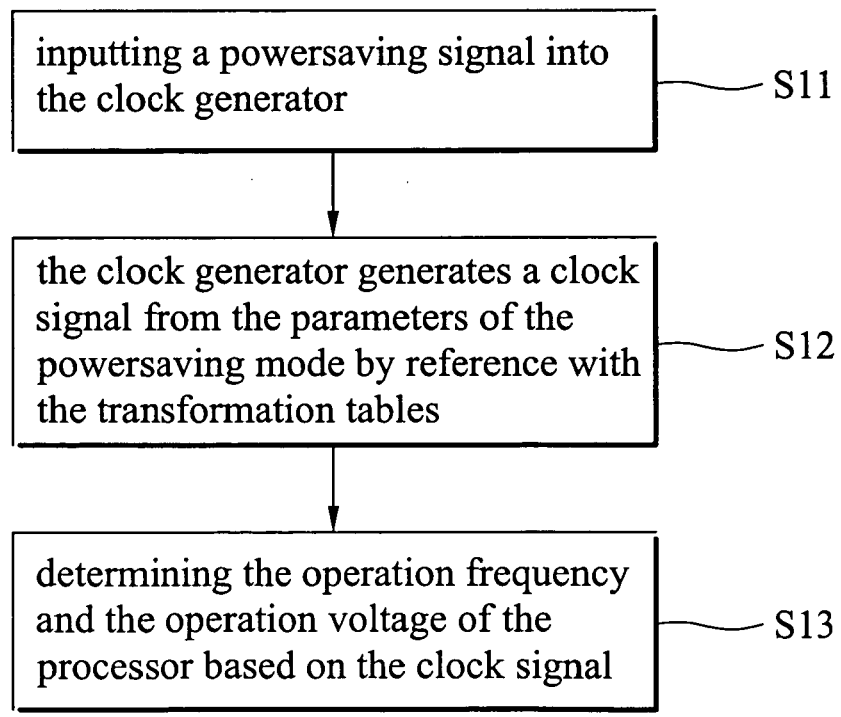
FIG. 3 is a schematic view of a transformation table as disclosed in this invention.
FIG. 4 is a flow chart of a power saving method as disclosed in this invention.

Furthermore, the clock generator 22 includes a plurality of transformation tables 221 therein. For example, one of the transformation tables 221 is shown in FIG. 3. From the parameters such as the type of power (AC or DC), the type of the desktop type processor 21 (CPU1 or CPU2), calculation modes of the desktop type processor 21 (over clock, normal, or power saving), the clock generator 22 can obtain the operational voltage (Va, Vb, Vc, Vd, Ve, Vf, Vg, Vh, Vi, Vj, Vk, Vl) and the operational frequency (Fa, Fb, Fc, Fd, Fe, Ff, Fg, Fh, Fi, Fj, Fk, Fl) required by the desktop type processor 21. It is understood that the transformation table in FIG. 3 is just an example, and is not limited to this. Thus, by referencing the transformation tables 221, the clock generator 22 can generate the clock signal from the control signal from the power management controller 23 and the judge signal from the desktop type processor 21.

Specifically, when the portable computer 100 is turned on, the desktop type processor 21 informs the clock generator 22 of its type (the judge signal) via the $I^2C$ bus 31 while the outer power supply (the DC power supply 24 or the AC power supply 25) informs the clock generator 21 of the power type (the control signal) used by the portable computer 100 via the power management controller 23. At this time, the clock generator 21 can obtain the operational voltage and frequency corresponding to the desktop type processor 21 by the transformation tables 221, and outputs a clock signal to the desktop type processor 21.

Figure 1A:
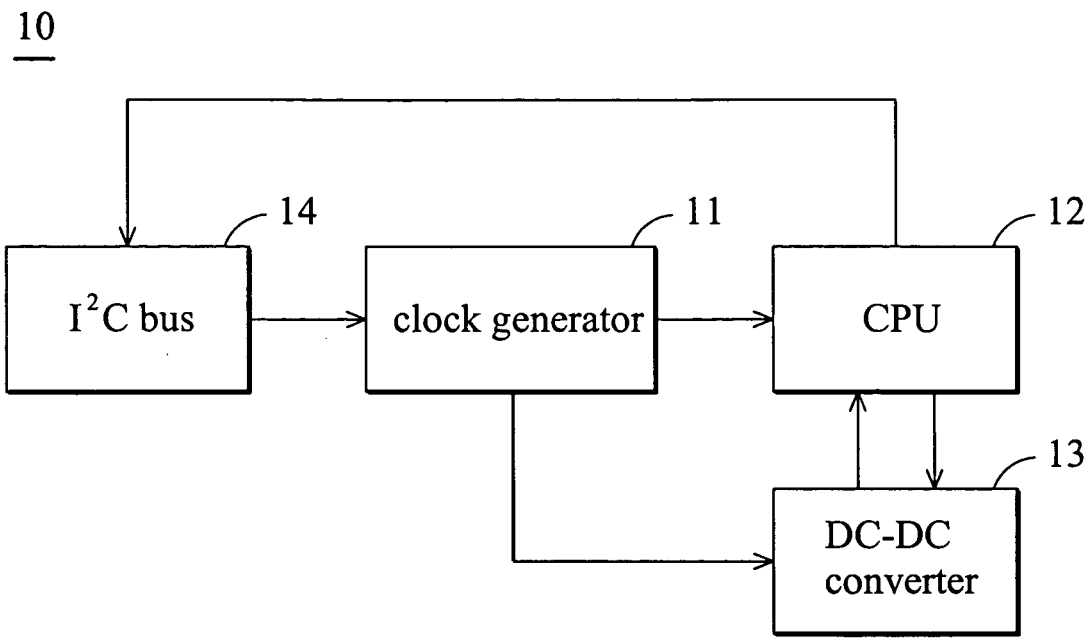
FIG. 1a is a block diagram of a conventional portable computer with a desktop type processor.
Figure 1B:
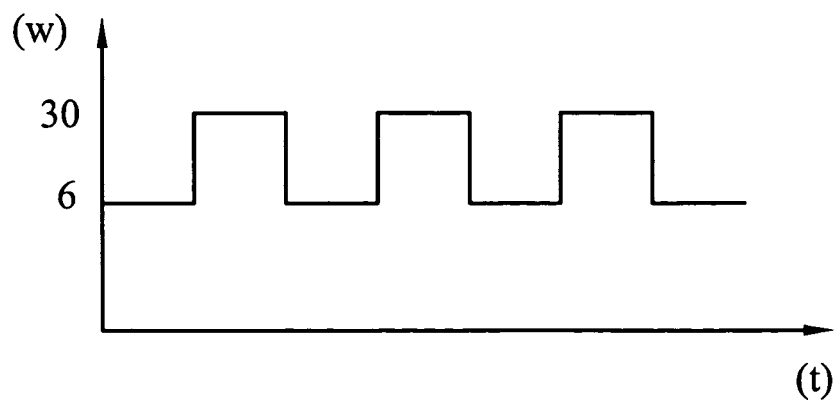
FIG. 1b is a diagram showing a relationship between the time and the power of the processor as shown in FIG. 1a in a power saving mode.

Furthermore, after the portable computer 100 is turned on, if the calculation mode of the desktop type processor 21 changes, such as from normal mode to power saving mode, or from the over clock mode to power saving mode, the clock generator 22 can be informed by a proper software. At this time, the clock generator 21 can still obtain the operational voltage and the operational frequency corresponding to the desktop type processor 21 by the transformation tables 221, and outputs a clock signal to the desktop type processor 21. Thus, the desktop type processor 21 can be operated at an optimal operational voltage and frequency. That is, unlike the conventional processor operated in a throttling manner as shown in FIG. 1b, in a power saving mode, the desktop type processor 21 can be continuously operated at the proper low operational voltage and frequency. Thus, the desktop type processor 21 can efficiently reduce power consumption.

The power management controller 23 judges the power type of the portable computer 100; that is, the power management controller 23 can judge the type of power supply (DC power supply 24 or AC power supply 25) connected to the portable computer 100 and informs the clock generator 22.

A DC power supply 24 is coupled to the power management controller 23 so that the power management controller 23 outputs a first control signal to the clock generator 22. The clock signal of the clock generator 22 is changed by the transformation tables 221 corresponding to the first control signal. Furthermore, the DC power supply 24 may be a battery.

An AC power supply 25 is also coupled to the power management controller 23 so that the power management controller 23 outputs a second control signal to the clock generator 22. The clock signal of the clock generator 22 is changed by the transformation tables 221 corresponding to the second control signal. It is noted that the AC power supply 25 may be coupled to the portable computer 100 via an adapter (not shown).

The chipset 26 is coupled to the clock generator 22 and the desktop type processor 21, and can assist the desktop type processor 21. Furthermore, an operational frequency and voltage of the chipset 26 are changed based on the operational frequency and voltage of the desktop type processor 21. However, the chipset 26 can also be independently operated.

The memory 27 is coupled to the clock generator 22 and the desktop type processor 21. An operational frequency and an operational voltage of the memory 27 are changed based on the operational frequency and voltage of the desktop type processor 21. However, the memory 27 can also be independently operated.

The DC-DC converter 28 is coupled to the clock generator 22 and the desktop type processor 21 so as to convert the outer voltage of the clock generator 22 to the inner operational voltage suitable for use by the desktop type processor 21. Furthermore, referring to FIG. 2, the logic unit 29 is disposed among the converter 28, the clock generator 22, and the desktop type processor 21. The logic unit 29 can receive the signal from the clock generator 22 and the desktop type processor 21 so as to determine the operational voltage suitable for use by the desktop type processor 21.

The APG card 32 is coupled to the clock generator 22, and obtains its operational voltage and frequency from the clock signal of the clock generator 22. It is noted only one APG card 32 is shown in FIG. 2. However, in practice, the portable computer 100 can include other auxiliary devices therein. Since the auxiliary devices are similar to those in the conventional portable computer, their description is omitted.

Referring to FIG. 4, a power saving method for a portable computer with a desktop type processor as disclosed in this invention includes the following steps. For the desktop type processor 21 entering the power saving mode, the signal for the power saving mode is input to the clock generator 22 as shown in step S11. Then, the clock generator 22 generates a proper clock signal from the power type of the portable computer from the power management controller 23 and the type of desktop type processor 21 by referencing the transformation tables 221 of the clock generator 22 as shown in step S12. Finally, according to the clock signal, the operational frequency and voltage of the desktop type processor 21 are determined as shown in step S13.

It is noted that when the calculation mode of the desktop type processor 21 is changed, the operational frequency and voltage of the desktop type processor 21 are linearly changed. For example, when the operational voltage of the desktop type processor 21 is reduced to seventy from one hundred, it is reduced incrementally, and is not immediately changed It is understood that the power saving method of this invention is different from the conventional method. Specifically, when the desktop type processor in the conventional portable computer enters the power saving mode, the operational frequency inside the processor changes, but the operational frequency outside the processor does not change. In contrast, when the desktop type processor in the portable computer as disclosed in this invention enters power saving mode, the operational frequency outside the processor changes first, and the operational frequency inside the processor changes second.

The portable computer and the power saving method as disclosed in this invention, enable a portable computer in a power saving mode, with a desktop type processor to operate at a stable low voltage. Thus, the invention achieves the object of efficient power consumption and the reliability and functionality of the portable computer is enhanced.

While the invention has been described by way of example and in terms of the preferred embodiment, it is to be understood that the invention is not limited to the disclosed embodiment. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable computer comprising:
a desktop type processor;
a power management controller for judging the type of the power of the portable computer; and
a clock generator, coupled to the power management controller and the desktop type processor respectively, for outputting a clock signal based on a control signal from the power management controller and a judge signal from the desktop type processor so as to determine an operational frequency and an operational voltage of the desktop type processor.

2. The portable computer as claimed in claim 1, wherein the clock generator includes a plurality of transformation tables therein so that the clock generator generates the clock signal from the control signal and the judge signal by referencing the transformation tables.

3. The portable computer as claimed in claim 2, further comprising:
a DC power supply coupled to the power management controller so that the power management controller outputs a first control signal to the clock generator, wherein the clock signal of the clock generator is changed by the transformation table corresponding to the first control signal.

4. The portable computer as claimed in claim 3, wherein the DC power supply is a battery.

5. The portable computer as claimed in claim 2, further comprising:
an AC power supply coupled to the power management controller so that the power management controller outputs a second control signal to the clock generator, wherein the clock signal of the clock generator is changed by the transformation table corresponding to the second control signal.

6. The portable computer as claimed in claim 1, further comprising:
a chipset coupled to the clock generator, wherein an operational frequency and an operational voltage of the chipset are changed based on the operational frequency and voltage of the desktop type processor.

7. The portable computer as claimed in claim 1, further comprising:
a memory coupled to the clock generator, wherein an operational frequency and an operational voltage of the memory are changed based on the operational frequency and voltage of the desktop type processor.

8. The portable computer as claimed in claim 1, further comprising:
a converter coupled to the clock generator and the desktop type processor so as to convert the voltage of the clock generator to the operational voltage of the desktop type processor.

9. The portable computer as claimed in claim 1, wherein the desktop type processor includes a plurality of calculation modes therein, and the operational frequency and voltage of the desktop type processor are linearly changed when the calculation modes change.

10. A power saving method for a portable computer with a desktop type processor, comprising:
providing a plurality of transformation tables; and
determining an operational frequency and an operational voltage of the desktop type processor from the type and a calculation mode of the desktop type processor by referencing the transformation tables.

11. The method as claimed in claim 10, wherein the operational frequency and voltage of the desktop type processor are linearly changed when the calculation mode of the desktop type processor changes.

12. The method as claimed in claim 10, wherein the portable computer further includes a chipset, and the method further comprises:
determining an operational frequency and an operational voltage of the chipset from the operational frequency and voltage of the desktop type processor.

13. The method as claimed in claim 10, wherein the portable computer further includes a memory, and the method further comprises:
determining an operational frequency and an operational voltage of the memory from the operational frequency and voltage of the desktop type processor.

* * * * *